United States Patent [19]
Zucker et al.

[11] 3,852,191
[45] Dec. 3, 1974

[54] PROCESS AND APPARATUS FOR THE PRODUCTION OF A DISPERSION OR SOLUTION FROM COMMINUTED SOLID SUBSTANCES AND A DISPERSION MEDIUM OR SOLVENT

[75] Inventors: Friedrich Josef Zucker, Mulheim (Ruhr); Hans-Dieter Bruchmann, Cologne-Deutz, both of Germany

[73] Assignee: Deutsche Supraton Bruchmann & Zucker KG, Dusseldorf, Germany

[22] Filed: Dec. 29, 1972

[21] Appl. No.: 334,788

Related U.S. Application Data
[63] Continuation of Ser. No. 136,761, April 23, 1971, abandoned.

[52] U.S. Cl................. 210/71, 210/73, 210/76, 210/82, 210/152, 210/194, 210/411, 209/273
[51] Int. Cl............................................. B01d 29/42
[58] Field of Search.......... 210/72, 73, 76, 82, 407, 210/414, 415, 152, 433, 434, 173, 174, 194, 411; 209/273; 162/55; 241/15, 21, 46.02, 46.17, 61, 79.2; 23/272.8

[56] References Cited
UNITED STATES PATENTS
| | | | |
|---|---|---|---|
| 1,452,151 | 4/1923 | Genter et al. | 210/76 X |
| 1,724,436 | 8/1929 | Sweetland | 210/76 |
| 1,923,135 | 8/1933 | Allen | 210/71 |
| 1,970,330 | 8/1934 | Mason | 241/21 |
| 3,074,553 | 1/1963 | Szepan et al. | 209/273 |
| 3,346,418 | 10/1967 | Chapman et al. | 210/433 X |
| 3,502,213 | 3/1970 | Kuribarashi | 210/433 X |
| 3,677,477 | 7/1972 | Watson et al. | 241/46.17 |

*Primary Examiner*—John Adee
*Attorney, Agent, or Firm*—Markva & Smith

[57] ABSTRACT

A continuous production of a dispersion or solution is provided by filtering liquid being processed continuously in a comminuting device. A filter is used to reduce and limit the size of particles in the effluents. The filter residue is continuously drawn off and recycled to the comminuter for further processing. The filter is backwashed periodically to prevent clogging and assure uninterrupted downstream flow.

9 Claims, 2 Drawing Figures

FRIEDRICH JOSEF ZUCKER
HANS-DIETER BRUCHMANN
INVENTOR

BY Markva, Smith & Kruger

3,852,191

PROCESS AND APPARATUS FOR THE PRODUCTION OF A DISPERSION OR SOLUTION FROM COMMINUTED SOLID SUBSTANCES AND A DISPERSION MEDIUM OR SOLVENT

RELATED APPLICATION

This is a continuation of application Ser. No. 136,761, filed Apr. 23, 1971, now abandoned.

BACKGROUND OF THE INVENTION

This invention relates to a process and an apparatus for the continuous production of a dispersion or solution from comminuted solid particles and a liquid medium, wherein the solid substances and the liquid have been mixed and comminuted to a desired consistency.

It is well known in the prior art to grind solid particles and to mix these particles with a liquid medium in various ways such as by agitators, mixers, kneading machines, homogenizing machines and the like, in order to obain a homogenous product. This operation can be effected by mixing the constituents either in batches or continuously in order to provide a product with the desired consistency. In most treatment processes, it is important that the homogenization be complete. That is, no solid particles which are larger than the desired size should be contained in the end product which is being processed. The large particle size can be due to many different reasons such as the structure of hardness of the material which would make it difficult to comminute. In a solubilizing process, the particles may have had their solubility impaired by previous thermal damage. Despite extensive treatment times and intensive mechanical processing, it is not always possible to obtain an end product or filtrate which is completely free of solid substances.

In many processes, such excessively large particles disturb the further treatment of the process. These large particles must either be removed from the mixture, or, as in the past, the mixture is subjected to further comminution to limit the particle size to the maximum desired. The latter method is generally uneconomical since a relatively small percentage, generally below 5 percent, of the particles are larger than the desired size while the remainder of the stream is in a finished state and can be processed further. Therefore, it frequently has been necessary to remove the coarse particles, those which exceed a predetermined size, by filtration.

Filters can be of many different types but those used in this type of a process are generally of the filter press type which utilize filter cloths. Where a hgh quality product is desired, the cleaning of the filters must be repeatedly performed which results in a considerable loss of particulate or residue material. In order to make the intervals between cleaning as long as possible, filters with a large filter surface area and therefore of considerable size are often used. If the process is to be made continuous, the filters are generally arranged in multiple fashion and are operated in an alternate manner. This kind of prior art arrangement involves a considerable expense in time and money and the loss of product involved with the cleaning operation of each filter. In addition to these limitations, the quantity of residual solid material accumulating on the filter cartridge may make it necessary to continually increase the upstream pressure in the system thereby possibly reducing the efficiency of the comminuting operation.

PURPOSE OF THE INVENTION

The primary object of this invention is to produce a dispersion, suspension or solution from a comminuted solid material and liquid medium wherein an end product with a predetermined particle size is achieved in a continuous and simple manner.

Another object is to eliminate the necessity for multiple filter arrangement and also the use of filters of excessively large size.

A further object is to provide a comminuting system wherein the residue from the filter which is composed of particles which exceed a predetermined size are recycled from the filter and returned to the comminuting device for reprocessing.

A still further object is to provide a filter system wherein the filter is backwashed periodically to prevent clogging of the pores and thus to provide a continuous flow of filtrate to the downstream process units.

SUMMARY OF THE INVENTION

The invention is directed to the process of and apparatus for the continuous removal and re-cycling of the residual portion of the dispersion or the like having a particle size exceeding a predetermined particle size from a filtration zone into a comminuting zone. A fraction of the dispersion or the like having predetermined particle size is separated out as a filtrate to be further processed. Advantageously, solid and liquid materials are thus subjected during their mixing operation at the same time to a comminuting treatment. Thus the recyled or rejected portion of the mixture which is the filter residue is subjected again to the comminuting treatment. By the arrangement of this invention, it is ensured that the rejected filter residues are continually recycled. Thus, those materials which cannot pass through the filter device are continually recycled to the processing zone until these particles are of such a size that they will pass through the filter device as part of the acceptable filtrate. In this extremely simple manner, a continuous operation and the desired end product is always obtained wherein the solid particles present do not exceed a predetermined particle size, so that the end product would not present any difficulty in further processing. A substantial saving in time and material loss normally associated with a filtering operation is eliminated by this completely closed system.

In a specific embodiment of the invention a particulate material and a liquid medium are stored in a tank or reservoir. The material transferred from the reservoir as required is introduced to the inlet of a mixing and comminuting device. The resultant dispersion is introduced into a filter apparatus which is advantageously arranged downstream of the comminutor. If desired, the filter apparatus can be connected directly to the outlet flange of this device. The filter residue which does not pass through the filter is returned to the comminutor by way of an outlet conduit from the filter case. It is also possible to again return the filter residue directly to the inlet of the filter.

Another feature of this invention is directed to the reversal of fluid flow within the filter apparatus to ensure that the filter will not become blocked. Other features are also directed to specific control of the filter residue recycling step.

BRIEF DESCRITION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
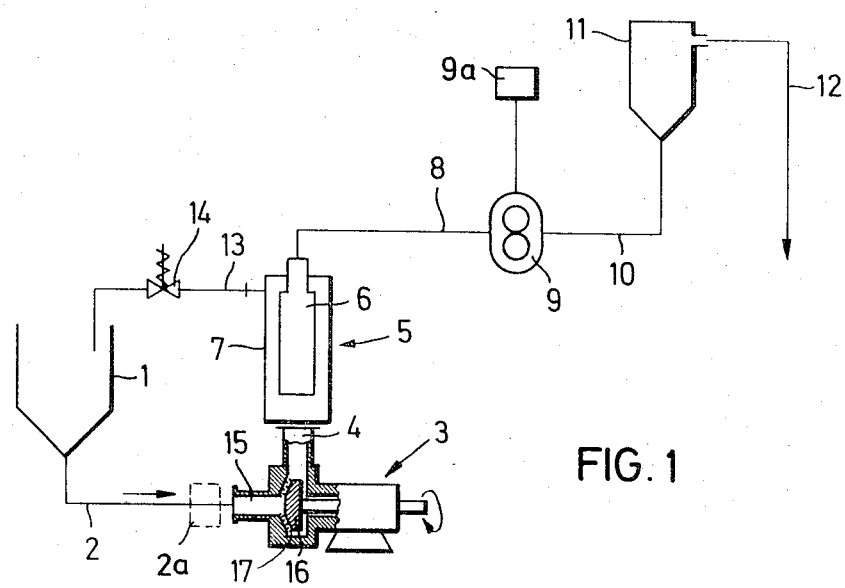
FIG. 1 is a schematic diagram of the processing system made in accordance with this invention.

More specifically, referring to FIG. 1, the processing system of the present invention includes a tank 1 for receiving and holding a supply of solid substances in a fluid medium. A conduit 2 leads from tank 1 to a mixing or comminuting device 3. A filtering device 5 is connected to the outlet conduit 4 of the comminuting device 3. The filtering device 5 consists of a tubular type filter cartridge 6 and a filter casing 7 which co-axially surrounds and is spaced from the filter cartridge 6. From the interior portion of the filter cartridge 6, an outlet conduit 8 leads to a pump 9 which is driven by a motor (not shown). A second conduit 10 leads from the pump 9 to a collecting tank 11 where the filtrate is either stored or is directly passed on through a conducting means 12 for further processing or treatment.

The method of conveying the material to the mixer 3 can be by any means desired. Thus, a conduit connection 2 with gravity feed could be used or, alternatively, a pump drive arrangement such as a screw conveyor 2a could bbe incorporated to move the particulate material and liquid medium to the mixing or comminutor device. If desired, the liquid medium need not be introduced into the holding tank 1 but can be injected directly into the conduit or passed through the hollow shaft of the screw conveyor 2a and into the mixer 3. In another embodiment the liquid can be introduced directly into the mixing device 3 such as to impinge on the rotor or stator thereof.

The mixing or comminuting device in this specific embodiment is composed of a centrifugal type pump or centrifuge 3. The inlet introduces the material directly into the center of the rotor. The conduit arrangement including the screw conveyor 2a conveys the solid material with simultaneous removal of air into the working cavity of the comminutor 3. The solid and liquid material are extensively mixed and homogenized in a device of this kind and a uniform dispersion is obtained. If necessary, a second similarly constructed device can be arranged downstream before the dispersion or mixture is fed to a filter 5. In the comminutor 3, the material is subjected to high shearing and cavitation forces and is substantially converted to a homogenous product. Instead of a rotating comminutor it is also possible to use any other device which subjects the product to frictional shearing or cavitation forces.

The comminuting device 3 is designed for a maximum volumetric throughput which is greater than the total output desired from the filter system. By control of the re-cycling operation, the excess quantity of mixture over and above the quantity required for throughput remain circulating in the system. This re-cycling flow continuously carries the rejected residual filter material back to the inlet of the comminuting device 3. Sufficient flow speed is maintained to prevent the settling of non-dissolved residual particles on the filter surface. The filter 5 consists of a tubular cartridge element 6 which can be made of porous porcelain, sintered metal, wire screen, or any other filter material. The cross section of the tubular cartridge 6 is made such that the entire quantity of mixture coming from the comminutor 3 can flow across the surface of the filter cartridge 6 in order that a cleaning action is provided. Thus, blockage of the filter material can be effected. The filter case 7 is connected at its end by means of a pipe 13 back to the inlet housing 15 of the comminutor 3. The comminutor inlet is so constructed that both the residue coming from the filter 5 and the mixture of solid and liquid medium continually introduced in a fresh state can enter the comminutor 3 co-axially without one product having a back pressure effect on the other. If desired, a venturi-shaped nozzle can be arranged for in the inlet portion for this purpose.

The comminuted product is introduced continually to the filter 5 in the form of a raw mixture and since it is under pressure, a portion of the mixture will pass through the pores of the filter 5. With appropriate dimensioning of the filter 5, e.g. 10 micron pore size, the acceptable filtrate is substantially free of solid substances which have not been dispersed or dissolved in a completely homogenous manner. The filtrate is collected in a second tank or reservoir 11 and thence passes, since it is still under pressure, to the further process stations as desired. The filter cartridge 6 is closed at its free end. This closed end can be designed in a pointed fashion so as to cause the incoming flow to separate and pass around the end of the filter cartridge 6. The inlet to the filter device 5 is co-axial to the free end of the cartridge 6. In other words, the longitudinal axis of the tubular filter cartridge 6 co-axially extends with respect to the outlet of the mixing device 3 to which the filter device 5 is directly attached as shown in the drawings. Thus the fluid flow from the mixing device 3 is aimed directly at the closed end of the filter cartridge 6 and thus across the surface of the filter cartridge 6. The raw unfiltered mixture is supplied to the tubular filter cartridge 6 in a tangential direction with respect to the tubular peripheral surface of the filter 6. This provides a scavenging effect and causes those particles which do not pass through the tubular filter cartridge 6 to be carried to the rear of the case 7. The rejected residue can be continuously drawn off through the conduit 13 which then returns this material to the holding tank 1. A flow control valve 14 is located in the conduit 13 to control the amount of filter residue which is continually drawn off from the filter case 7 and re-cycled to the tank 1. Since the solid particles and fluid medium are subjected to additional work energy in the mixing or comminuting machine 3, the temperature of the raw mixture produced is elevated. By the use of the control valve 14 the amount of re-cycle residue flow can be regulated to maintain a desired temperature in the processing system. This control can be provided automatically if desired, by the addition of a thermostat and temperature sensing control (not shown) which can be used to operate the control valve 14. The repeated re-cycling operations eventually reduce the size of particles of the material until they have entered fully into the solution or at least have become so fine that they can pass through the pores of the filter cartridge 6.

The removal of the filtrate from the interior of the filter cartridge 6 is conveniently effected by a pump 9 which delivers the filtrate to the second tank or reservoir 11. The filtrate is then passed to further processing. As needed, pressure reversal in the filter outlet can be intermittently effected, for example by reversing the pump 9 or exerting back pressure, such as by means of a piston-cylinder unit 18. As a result, a return flow backwashing action is achieved intermittently through the filter cartridge 6, thus it is assured that the filter element 6 will not become blocked and thus cause a reduction in the flow or interruption of the flow to the downstream processing units.

The pump 9 which could be of the gear type, can have its direction of running reversed. This direction reversal would cause the flow to reverse in the conduits 8 and 10 thus drawing filtrate from the collecting tank 11 and back-flushing the filter cartridge 6. An impulse switch 9a is used in this specific embodiment to facilitate the periodic back-flushing of the filter cartridge 6 as needed. Thus the filter residue which is composed of coarse material and those solid particles which cannot pass through the pores of the filter 6 are prevented from settling on the filter cartridge 6 or clogging the pores thereof. By this method, the filter cartridge 6 will never become completely plugged and thus cause a reduction or stoppage of the flow of filtrate. During the backwashing operation, the mixing and comminuting operation can continue. The backwashing would momentarily cause an increase in pressure within the filter cartridge 6 thus reversing the flow across the cartridge causing a raw solid-liquid mixture with all residue to pass out through the re-cycled conduit 13. If desired, the return of the residue material to the system can be effected directly into the filter 5 via the inlet conduit 4 by means of a venturi nozzle.

The mixer-comminutor device used in this system is intended to continuously comminute or dissolve the solid particles in the fluid medium to provide a dispersion or solution which is advantageous in the use of further processing equipment. The comminutor 3 is similar to a centrifugal pump and comprises a housing 15 with an inlet and outlet opening and the rotor 16 adapted to rotate within the housing. The front face of the rotor towards the inlet incorporates concentrically radial rings which increase in diameter from the hub of the rotor. The inside surface or stator of the housing, opposite the front face of the rotor, includes also a set of concentrically radial rings which intermesh and alternate with the rings on the rotor. This arrangement is very similar to the labyrinth type seal which is common in this art. The clearance between the individual rings and the top surface of each ring with respect to the opposing surface is provided with the proper clearance to produce the size particles which are desired in the later processing operations. The product to be dealt with passes into the inlet of the comminutor, across the face of the rotor and stator ridges where it is comminuted either by friction or by the impact and shearing action caused by the rotational motion of the rotor element.

The stator and rotor can be constructed in many different ways. It is possible to use a construction wherein a rough or profiled surface exists on the opposite stator and rotor faces. It is possible to use a rotor element which has radial vanes, bores or slots extending from the center to the periphery for passage of the raw filtrate. In addition to this, it is possible to provide co-axial slots within the vanes or passageways and incorporate co-axial baffles which mate with these slots to provide a shearing action to the raw filtrate. The degree of communition and thus the maximum grain size of the filtrate can be varied by the clearance provided between the rotor and stator elements and the construction or configuration of the baffle rings.

Figure 2:
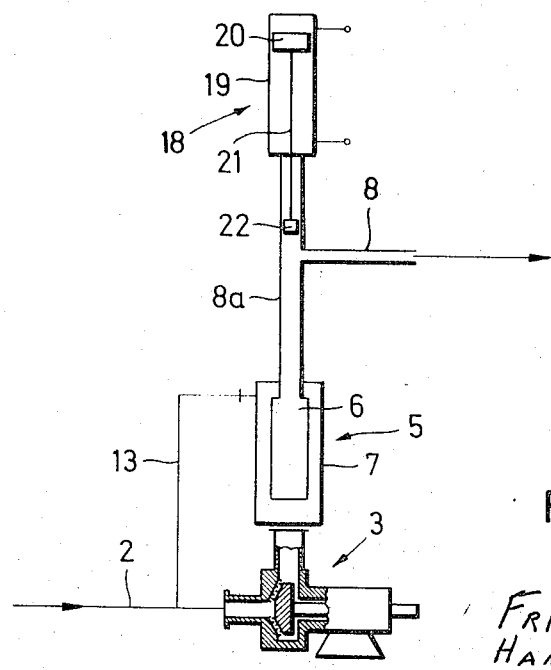
FIG. 2 is a schematic diagram which shows another embodiment of the invention.

In the example of the embodiment shown in FIG. 2, a piston cylinder unit 18 is provided for the backwash processing of the filter 5. The discharge conduit incorporates a piston and cylinder device 18. Within the cylinder 19 is a piston 20 which is connected by a piston rod through proper seal glands to a piston 22 arranged within the conduit 8a. The piston 20 can be operated by hydraulic or pneumatic means. By applying pressure to the side of the piston 20 which is opposite the piston rod 21, a force is applied to the piston rod 21 and the piston 22. The advancing piston 22 forces the filtrate back into the filter cartridge 6. The increase in pressure of the filtrate on the downstream side of the filter cartridge causes the filtrate to backflow through the filter cartridge 6 into the chamber 7. The filter element 6 is thereby cleaned of solid particles which have lodged in the pores. The piston-cylinder device 18 is operated in a pulsed intermittent manner during the operation of the system and thus the filter cartridge 6 is always maintained in a cleaned and open condition.

Since the volumetric output of the comminutor 3 increases with decreasing viscosity of the product, i.e., with the decreasing viscosity of the mixture the flow speed increases within the system. On the other hand, an increase in the flow speed in the system also increases the temperature of the mixture which in turn reduces the viscosity thereof. Thus a control means can be incorporated in the re-cycle residue line so that control of the flow of the re-cycled residue to the inlet of the comminutor 3 can provide the necessary temperature and viscosity control that is required in the system. As a result, with a sufficient degree of residue throttling, the outlet product temperature can be influenced and adapted both for optimum filtering operation and for the downstream process stages.

The above described process and apparatus can be used universally for the production of suspension, dispersions or solutions in many different fields. An important field is in the processing of plastic materials for the production of fibers. For example, in the production of the solution of synthetic fiber or raw material such as polyacrylonitrile in dimethyl formamide. Here it is important to obtain a completely homogenous solution with solid particles of predetermined size in order that in downstream spinning operations the nozzles will not become blocked. Furthermore, it is possible to continuously produce dispersions or emulsions form polymers or a highly viscous oil phase, which contain maximum particle sizes of predetermined value. A further field is the processing of organic or inorganic pigments such as in the manufacture of varnishes, paints, printing inks, printing compositions for use on papers which are composed of starch solutions, clay or casein and the like and also of powder compositions, toothpastes, cosmetics, and the like. Generally dissolving operations are also possible, such as in the difficult dissolving operation of iodine in alcohol. A further use could be made in the production of emulsions of controlled particle size wherein fineness and consistency is of importance, for example, milk and dairy products, medicines, ointments, paste and the like.

While the process and apparatus for the production of a dispersion or solution from comminuted solid substances and a dispersion medium or solvent has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A process for the continuous production of a filtrate from a mixture of solid materials and a fluid medium consisting essentially of the steps of:
   a. supplying solid materials having varying particle sizes and a fluid medium to form a mixture thereof,
   b. subjecting the mixture to a comminuting treatment in a comminuting treatment zone,
   c. introducing the mixture of the solid material and the fluid medium into a filtering zone directly from the comminuting treatment zone,
   d. passing an acceptable portion of the mixture of solid material and fluid medium through a filter which allows a predetermined particle size of solid material to pass therethrough thereby leaving a rejected residue, and then
   e. recycling said rejected residue which contains particle sizes exceeding said predetermined particle size directly to the comminuting treatment zone.

2. The process as defined in claim 1 wherein the recycling step includes controlling the flow rate of the recycled residue or maintaining a desired temperature of the solid and fluid medium mixture being treated.

3. The process as defined in claim 1 wherein a counter pressure is intermittently created within the filtering zone to backwash the filter and thus cause the filter residue to be dispersed into the flow of recycling fluid material.

4. A process as defined in claim 1 wherein said mixture of solid materials and fluid medium is introduced into the filtering zone in a direction transverse to the flow of the material through the filter.

5. A process as defined in claim 4 wherein said mixture of solid materials and fluid medium is introduced into the filtering zone in a direction tangential to the filter.

6. In an assembly for treating a continuous flow of solid materials and a fluid medium, the combination comprising:
   a. comminuting means for forming a mixture of solid materials in a fluid medium and having an inlet and an outlet,
   b. filtering means being directly attached to the outlet of the comminuting means for separating an acceptable filtrate portion of the mixture including solid material having a predetermined particle size from a rejected filtering residue,
   c. said filtering means including an inlet means and a filter cartridge having a longitudinal axis co-axial with the inlet means so that a flow of the mixture of solid materials and liquid from the outlet of the comminuting means is directed in a tangential direction across the surface of the cartridge,
   d. recycling means to continuously draw off the rejected filtering residue which includes solid materials having a particle size exceeding said predetermined particle size, and
   e. means for removing the acceptable filtrate portion from the filter means,
   f. said recycling means being directly connected to the comminuting means to re-feed the rejected filtering residue directly to the comminuting means.

7. In an assembly for treating a continuous flow of solid materials and fluid medium and having an inlet and an outlet,
   a. comminuting means for forming a mixture of solid materials and fluid medium and having an inlet and an outlet,
   b. filtering means being directly attached to the outlet of the comminuting means for separating an acceptable filtrate portion of the mixture including solid material having a predetermined particle size from a rejected filtering residue,
   c. said filtering means including a tubular filter cartridge having a logitudinal axis co-axially extending with respect to the outlet of the comminuting means so that a flow of the mixture of solid materials and liquid from the outlet of the comminuting means is directed in a tangential direction across the surface of the cartridge,
   d. recycling means to continuously draw off the rejected filtering residue which includes solid materials having a particular size exceeding said predetermined particle size, and
   e. means for removing the acceptable filtrate portion from the filter means, and
   f. said recycling means being directly connected to the comminuting means to re-feed the rejected filtering residue directly to the comminuting means.

8. In an assembly for treating a continuous flow of solid materials and a fluid medium the combination comprising:
   a. comminuting means for forming a mixture of solid materials and fluid medium and having an inlet and an outlet,
   b. filtering means being directly attached to the outlet of the comminuting means for separating an acceptable filtrate portion of the mixture including solid material having a predetermined particle size from a rejected filtering residue,
   c. said filtering means including a housing and a tubular filter cartridge disposed in spaced relationship inside said housing,
   d. said tubular filter cartridge having a longitudinal axis co-axially extending with respect to the outlet of the comminuting means so that a flow of the mixture of solid materials and liquid from the outlet of the comminuting means is directed in a tangential direction across the surface of the cartridge,
   e. recycling means to continuously draw off the rejected filtering residue which includes solid materials having a particular size exceeding said predetermined particle size, and f. means for removing the acceptable filtrate portion from the filter means, and
g. said recycling means being directly connected to the comminuting means to re-feed the rejected filtering residue directly to the comminuting means.

9. An assembly as defined in claim 8 wherein said filter cartridge has a closed free end that is extending in a direction toward the outlet of the comminuting means.

* * * * *